US008983691B2

(12) United States Patent
Amundson et al.

(10) Patent No.: US 8,983,691 B2
(45) Date of Patent: Mar. 17, 2015

(54) ELECTRIC LAWN TRACTOR ROLL AWAY PREVENTION SYSTEM

(75) Inventors: Roger K. Amundson, West Fargo, ND (US); Jacob C. Kallara, Morrisville, NC (US); Patrick W. Cross, Cary, NC (US); Troy W. Harris, III, Charlotte, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/568,492

(22) Filed: Aug. 7, 2012

(65) Prior Publication Data
US 2014/0046516 A1 Feb. 13, 2014

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
*G06F 17/00* (2006.01)
*B60W 20/00* (2006.01)
*B60W 10/08* (2006.01)

(52) U.S. Cl.
CPC ............... *B60W 20/00* (2013.01); *B60W 10/08* (2013.01)
USPC ........ 701/22; 701/1; 701/70; 701/82; 701/84; 701/88

(58) Field of Classification Search
CPC ............ B60L 11/1803; B60L 11/7258; B60L 15/2081; B60L 3/007; B60L 3/14; B60L 11/18; B60L 15/04; Y02T 10/6217; Y02T 10/7005; Y02T 10/644; Y02T 10/7258; H02K 5/1732; H02K 1/28; H02K 16/00; H02K 11/00; H02K 1/06; H02K 7/14

USPC ................. 701/22; 310/89; 180/65.21, 65.22, 180/65.31, 6.24
See application file for complete search history.

(56) References Cited

U.S. PATENT DOCUMENTS

| 4,629,043 | A | 12/1986 | Matsuo et al. |
| 5,791,750 | A | 8/1998 | Spiegelberg |
| 5,975,648 | A | 11/1999 | Rump |
| 7,332,881 | B2 | 2/2008 | Clark et al. |
| 7,486,064 | B2 | 2/2009 | Sasaki et al. |
| 7,560,882 | B2 | 7/2009 | Clark et al. |
| 7,768,247 | B2 | 8/2010 | Sasaki et al. |
| 7,825,616 | B2 | 11/2010 | Clark et al. |
| 8,120,291 | B2 | 2/2012 | Clark et al. |
| 8,227,948 | B1 * | 7/2012 | Fox et al. ......................... 310/89 |
| 8,543,295 | B2 * | 9/2013 | Bryant et al. ................... 701/42 |

(Continued)

FOREIGN PATENT DOCUMENTS

JP 2008168871 A 7/2008

OTHER PUBLICATIONS

European Search Report issued in counterpart application No. 13179272.3, dated Aug. 8, 2014 (7 pages).

*Primary Examiner* — Calvin Cheung
*Assistant Examiner* — Luis A Martinez Borrero

(57) ABSTRACT

An electric lawn tractor roll away prevention system includes a brushless DC electric motor powering a traction drive wheel on the electric lawn tractor. The motor is connected to phase wires and provides a back EMF voltage on the phase wires if the electric lawn tractor rolls and turns the traction drive wheel without electric power from the motor. A three phase inverter rectifies the back EMF voltage, turns on the traction controller if the rectified voltage reaches a pre-specified threshold, and applies a voltage to the phase wires to reduce the speed of the electric lawn tractor by regenerative braking.

10 Claims, 2 Drawing Sheets

(56) References Cited

U.S. PATENT DOCUMENTS

| | | | |
|---|---|---|---|
| 2004/0148070 A1* | 7/2004 | Ishikawa et al. | 701/22 |
| 2005/0075766 A1* | 4/2005 | Kobayashi et al. | 701/22 |
| 2005/0126145 A1* | 6/2005 | Hunt et al. | 56/11.9 |
| 2006/0152079 A1* | 7/2006 | Werner | 303/191 |
| 2009/0065273 A1* | 3/2009 | Wyatt et al. | 180/65.8 |
| 2009/0069964 A1* | 3/2009 | Wyatt et al. | 701/22 |
| 2009/0228183 A1* | 9/2009 | Watabe et al. | 701/90 |
| 2009/0299557 A1 | 12/2009 | Farnsworth | |
| 2010/0036555 A1* | 2/2010 | Hosoda et al. | 701/22 |
| 2010/0111706 A1 | 5/2010 | Abraham | |
| 2010/0191400 A1* | 7/2010 | Ajiro | 701/22 |
| 2011/0106357 A1* | 5/2011 | Clark et al. | 701/22 |
| 2011/0178666 A1 | 7/2011 | Marcus | |
| 2011/0184615 A1 | 7/2011 | Marcus | |
| 2012/0116628 A1* | 5/2012 | Clark et al. | 701/22 |

\* cited by examiner

ELECTRIC LAWN TRACTOR ROLL AWAY PREVENTION SYSTEM

FIELD OF THE INVENTION

This invention relates generally to electric lawn tractors and similar vehicle used for mowing and other work, and specifically to an electric lawn tractor roll away prevention system.

BACKGROUND OF THE INVENTION

In the past, electric lawn tractors and electric riding mowers can roll away if the operator exits the vehicle without properly and safely securing the vehicle. For example, electric lawn tractors may roll down a slope if the operator leaves the vehicle without placing the transmission in park and/or setting the park brake.

Automatic parking brake systems on vehicles such as golf carts have not been satisfactory for roll away prevention of electric lawn tractors because they require a controller and/or electrical system to remain in an active, power consuming state out powering down. As a result, automatic parking brake systems drain batteries needed to operate the vehicle and to continue operating the automatic parking brake system, U.S. Pat. Nos. 7,332,881, 7,560,882, 7,825,615 and 8,120,291 are examples of automatic, parking brake systems. Systems that prevent removal of the ignition key until the vehicle is safely parked and the park brake is engaged also have not been satisfactory because they do not prevent the vehicle from rolling away it the operator leaves the ignition key in place. U.S. Pat. No. 5,975,648 relates to one of these systems for passenger vehicles. Systems on passenger vehicles that include wheel speed or drive shaft rotation sensors also are not satisfactory for roll away prevention of electric lawn tractors because they increase the cost and complexity of the vehicle.

A simple and economical electric lawn tractor roll away prevention system and method is needed that does not require the vehicle to remain in an active, power consuming state, but that allows powering down the vehicle controller and/or electrical systems. An electric lawn tractor roll away prevention system is needed that prevents the vehicle from roiling away even if the ignition key is in place. An electric lawn tractor roll away prevention system is needed that does not require additional sensors to detect movement of the vehicle.

SUMMARY OF THE INVENTION

An electric lawn tractor roll away prevention system includes a brushless DC electric motor powering one or more traction drive wheels on the electric lawn tractor. The motor may be connected to phase wires and provides a back EMF voltage on the phase wires if the electric lawn tractor rolls and turns the traction drive wheel without electric power from the motor. A traction controller may be connected to the phase wires and has a three phase inverter that rectifies the back EMF voltage, turns on a traction controller power supply if the rectified voltage reaches a pre-specified threshold, and applies a voltage to the phase wires to reduce the speed of the electric lawn tractor by regenerative braking.

The electric lawn tractor roll away prevention system is simple and economical and does not require the vehicle to remain in an active, power consuming state, but allows powering down the vehicle controller and/or electrical systems. The electric lawn tractor roll away prevention system prevents the vehicle from rolling away even if the ignition key is in place, and does not require additional sensors to detect movement of the vehicle.

DESCRIPTION OF THE PREFERRED EMBODIMENT

Figure 1:
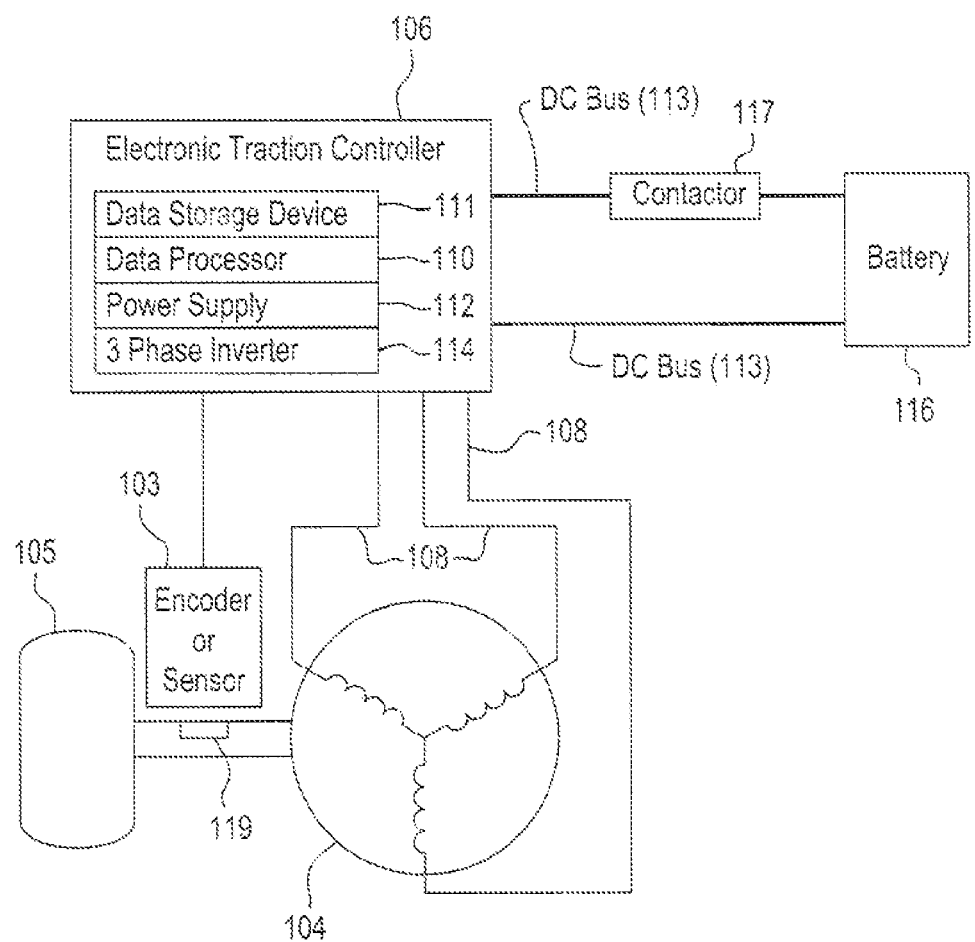
FIG. 1 is a schematic diagram of an electric lawn tractor roll away prevention system according to a first embodiment of the invention.

FIG. 1 shows one embodiment of an electric lawn tractor roll away prevention system. The electric lawn tractor may have an electric traction drive motor 104 that drives one or more ground engaging wheels 105. The electric traction drive motor may be connected directly or indirectly through a belt and/or transaxle to wheel or wheels 105. The traction drive motor preferably may be a brushless DC electric motor having permanent magnets on the rotor. The electric lawn tractor also may have one or more rotating blades for mowing grass or other vegetation. For example, each blade may be rotated by an electric motor (not shown).

In one embodiment, the electric lawn tractor roll away prevention system may include electronic traction controller 106. The traction controller may include data processor 110, data storage device 111 and power supply 112. The data processor may comprise a microprocessor, microcontroller, programmable logic array, logic circuit, arithmetic logic unit, application specific integrated circuit, digital signal processor, or another data processor. The data storage device may comprise electronic memory, non-volatile electronic memory, random access memory, electronically erasable programmable memory, magnetic storage device, optical storage device, magnetic disc drive, optical disc drive, or another data storage device. The data storage device may store or contain software instructions of software modules for roll away prevention. The power supply may include an under voltage lockout (UVLO) circuit with a comparator to enable or disable the traction controller.

In one embodiment, the traction controller of the electric lawn tractor roll away prevention system may include 3-phase inverter 114. The 3-phase inverter may be electrically connected to phase wires 108 of the electric traction drive motor. The UVLO circuit may compare the voltage generated by the electric traction drive motor (Vbus), or a scaled version of \Thus, to a fixed reference voltage (Vref). The electric lawn tractor roll away prevention system also may include battery pack 116 or another electric power source providing a charge such as 48 volts which may be connected through contactor 117 to DC bus 113.

In one embodiment, the electric lawn tractor roll away prevention system also may include position encoder 103. A magnet or magnets 119 may be provided in or secured to a shaft of the wheel or traction drive motor, and the position encoder may measure and monitor rotation of the wheel or motor shaft. Alternatively, an optical sensor, pulse encoder, gear driven sensor or contact sensor may be provided instead of the magnet and encoder.

Figure 2:
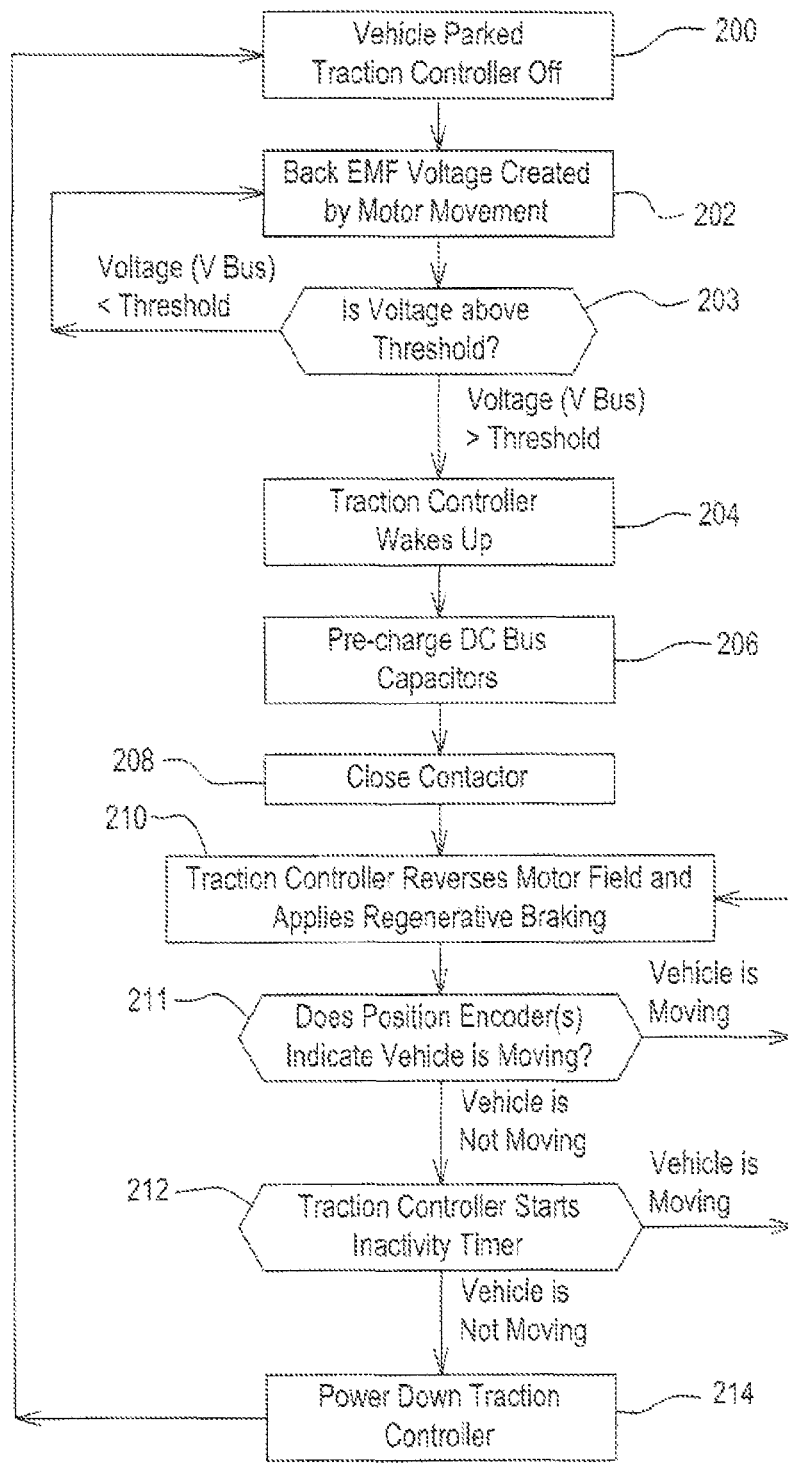
FIG. 2 is a logic diagram of an electric lawn tractor roll away prevention system according to a first embodiment of the invention.

In one embodiment, the electric lawn tractor roll away prevention system may use the method described in the flow diagram of FIG. 2. In block 200, the electric lawn tractor may be parked and electronic traction controller 106 may be off.

For example, the traction controller may be off when direct current power from a battery or other energy storage device to the traction motor is removed by the ignition switch or another switch assembly controlled by the data processor or a logic circuit. Power to the traction controller may be turned of if the ignition key is removed, or an under voltage lockout circuit may be used to turn off power to the traction controller if battery voltage drops below a specific threshold or operational value.

In one embodiment, in block 202 the electric lawn tractor may roll or be pushed sufficiently to turn the shaft of electric traction drive motor 104 and create a back EMF voltage on phase wires 108. For example, the back EMF voltage may be created if the electric lawn tractor starts rolling down a slope. The 3-phase inverter 114 in the traction controller may rectify the back EMF voltage on the phase wires to provide a voltage (Vbus).

In one embodiment, in block 203, the UVLO circuit may compare the voltage (Vbus) to a fixed reference voltage (Vref). If the voltage (Vbus) reaches a pre specified threshold voltage such as 9 volts or 12 volts, power supply 112 turns on and wakes up the traction controller in block 204. For example, the threshold voltage to wake up the traction controller may be created from back EMF voltage of a traction motor rotating in a range of about 500 rpm up to about 1000 rpm, corresponding to a vehicle speed in forward or reverse of at least about 1 mph depending on transaxle gear ratios or other drive train components. If the traction controller wakes up and then the voltage (Vbus) goes under the threshold, the traction controller then may turn off and return the system to block 202.

In one embodiment, once the traction controller wakes up in block 204, the traction controller input capacitors may be pre-charged in block 206. Pre-charging the controller input capacitors may slow down the activation time of a high voltage power-up, and limit the in-rush current during power-up. For example, the controller input capacitors may be pre-charged through a circuit having at least one charge limiting resistor connected to one side of the capacitor.

In one embodiment, once the traction controller detects the pre-charge voltage level of the input capacitors is sufficiently high, such as about 90 percent of the battery pack voltage of 48 volts, the pre-charge resistance may be switched or removed out of the circuit and the controller may close or engage main contactor 117 to battery pack 116 while the electric lawn tractor remains in the roll away prevention mode.

In one embodiment, after main contactor 117 to battery pack 116 is closed, in block 210 the traction controller may use regenerative braking to slow or stop the electric lawn tractor. The traction controller may reverse the electric motor fields and apply the battery load to the traction motor phase wires to limit tie electric lawn tractor speed to an acceptable roll away speed such as 1 mph.

In one embodiment, in block 211 if the traction controller receives, signals from the position encoder indicating the electric lawn tractor is not moving, the traction controller may start an inactivity timer in block 212. For example, the threshold indicating the electric lawn tractor is not moving may be a traction motor speed in a range of about 0 rpm to about 100 rpm, corresponding to a vehicle speed in forward or reverse of about 0.15 mph depending on transaxle pear rations or other drive train components. If the traction controller continues receiving signals from the position encoder indicating no electric lawn tractor movement for at least a threshold time period after starting the inactivity timer, in block 214 the controller may power down the system, including opening the contactor to the battery pack.

In one embodiment, if the system starts the inactivity timer in block 212, but the traction controller then receives signals from the position encoder indicating electric lawn tractor movement before reaching the threshold time period, the tration controller may return to block 210 and continue regenerative braking to slow the electric lawn tractor.

Having described a preferred embodiment, it will become apparent that various modifications can be made without departing from the scope of the invention as defined in the accompanying claims.

The invention claimed is:

1. An electric lawn tractor roll away prevention system, comprising:
   a brushless DC electric motor mounted to a traction drive wheel on the electric lawn tractor, the motor connected to phase wires and providing a back electromotive force voltage on the phase wires when the electric lawn tractor is in a parked position and then rolls and turns the traction drive wheel without electric power from the motor; and
   a traction controller connected to the phase wires and having a three phase inverter that rectifies the back electromotive force voltage, the traction controller being powered off and turning on when the rectified voltage reaches a pre-specified threshold, and applies a voltage from a battery pack to the phase wires to reduce the speed of the electric lawn tractor by regenerative braking.

2. The electric lawn tractor roll away prevention system of claim 1 wherein the traction controller turns off when the rectified voltage indicates the electric lawn tractor stops rolling.

3. The electric lawn tractor roll away prevention system of claim 1 wherein the brushless DC electric motor powers a pair of traction drive wheels on the electric lawn tractor.

4. An electric lawn tractor roll away prevention system, comprising:
   a traction controller connected to phase wires of an electric traction drive motor, the traction controller being in a non-power consuming off condition before turning on after the electric lawn tractor starts rolling from a parked position without power from an energy storage device to the electric traction drive motor in response to a threshold back electromotive force voltage from phase wires connected to the electric traction drive motor indicating at least a specified rolling speed and then reversing the electric traction drive motor.

5. The electric lawn tractor roll away prevention system of claim 4 further comprising a contactor to a battery pack that the traction controller closes after it senses the threshold back electromotive force voltage.

6. An electric lawn tractor roll away prevention system of claim 5 wherein the traction controller pre-charges input capacitors before closing the contactor.

7. The electric lawn tractor roll away prevention system of claim 4 further comprising a wheel encoder providing the traction controller with a rolling speed after the traction controller is turned on.

8. An electric lawn tractor roll away prevention system comprising:
   an electronic traction controller connected by phase wires to an electric traction drive motor, the electric traction drive motor providing back electromotive force voltage on the phase wires when a roll away condition exists from a park position absent power from an energy storage device to the electric traction drive motor; the back electromotive force voltage turning the electronic traction controller from a non-power consuming off condition to an on condition when the back electromotive force voltage exceeds a threshold; the traction controller reversing the motor field to apply regenerative braking when the roll away condition continues after the electronic traction controller is on.

9. The electric lawn tractor roll away prevention system of claim 8 wherein the traction controller closes a contactor to a battery pack before applying regenerative braking.

10. The electric lawn tractor roll away prevention system of claim 8 further comprising a wheel encoder to detect when the roll away condition continues after the traction controller is on.

\* \* \* \* \*